United States Patent
Seneger et al.

(10) Patent No.: US 11,842,715 B2
(45) Date of Patent: Dec. 12, 2023

(54) VEHICLE NOISE CANCELLATION SYSTEMS AND METHODS

(71) Applicant: Volvo Car Corporation, Gothenburg (SE)

(72) Inventors: Jon Seneger, Boulder Creek, CA (US); Peter Winzell, Mountain View, CA (US)

(73) Assignee: Volvo Car Corporation, Gothenburg (SE)

(*) Notice: Subject to any disclaimer, the term of this patent is extended or adjusted under 35 U.S.C. 154(b) by 0 days.

(21) Appl. No.: 17/487,212

(22) Filed: Sep. 28, 2021

(65) Prior Publication Data
US 2023/0097755 A1 Mar. 30, 2023

(51) Int. Cl.
*G10K 11/178* (2006.01)
*G06V 20/59* (2022.01)

(52) U.S. Cl.
CPC ...... *G10K 11/178* (2013.01); *G10K 11/17823* (2018.01); *G06V 20/593* (2022.01); *G10K 2210/1282* (2013.01); *G10K 2210/3038* (2013.01)

(58) Field of Classification Search
CPC .............. G10K 2210/3038; G10K 2210/1282
See application file for complete search history.

(56) References Cited

U.S. PATENT DOCUMENTS

| | | | |
|---|---|---|---|
| 10,347,236 B1* | 7/2019 | Bastyr | G10K 11/17823 |
| 10,418,019 B1* | 9/2019 | Murad | G10K 11/1754 |
| 2020/0194023 A1* | 6/2020 | Tintor | H04R 5/04 |
| 2021/0020156 A1* | 1/2021 | Tachi | G10K 11/17855 |
| 2023/0085506 A1* | 3/2023 | Bastyr | G10K 11/17821 |

* cited by examiner

*Primary Examiner* — Ping Lee
(74) *Attorney, Agent, or Firm* — Clements Bernard Walker; Christopher L. Bernard

(57) ABSTRACT

A vehicle noise cancellation system and method, operable for: receiving local contextual information affecting a soundwave present in a vehicle; receiving remote contextual information affecting the soundwave present in the vehicle; receiving vehicle occupant information; processing the local contextual information, the remote contextual information, and the vehicle occupant information to generate an augmented anti-soundwave; and delivering the augmented anti-soundwave to an occupant of the vehicle to mitigate the soundwave present in the vehicle. Delivering the augmented anti-soundwave to the occupant of the vehicle to mitigate the soundwave present in the vehicle may include delivering the first augmented anti-soundwave to an occupant present in the first zone of the vehicle and delivering the second augmented anti-soundwave to an occupant present in the second zone of the vehicle using a plurality of speakers.

20 Claims, 10 Drawing Sheets

Sw + Sw' + Sd = Sd

VEHICLE NOISE CANCELLATION SYSTEMS AND METHODS

TECHNICAL FIELD

The present disclosure relates generally to the automotive and noise cancellation fields. More particularly, the present disclosure relates to vehicle noise cancellation systems and methods using spatial audio functionality with semantic understanding of the immediate, near, and far surroundings.

BACKGROUND

Current static noise cancellation solutions have limited impact on the cabin noise level in a vehicle. Such solutions typically consist of passive sound dampening measures integrated into the body of the vehicle to limit the pass-through of noise. These hardware-based implementations, with passive sound absorption material, adding sound-deadening butyl and foam inlays to reduce cabin noise from exterior sound interference, add significant weight to the body of the vehicle and have limited impact on the cabin noise level. Adding conventional active noise cancellation solutions based on predefined audio models can improve this.

Current vehicle audio systems typically consist of high-performance speaker systems with premium sound microphones for the use of hands-free phones, the voice control of infotainment and navigation systems, and the like. There are often up to four such microphone units installed in the b-pillar and the roof of a vehicle. The placement of these microphones can be described as directional for voice input audio quality with respect to the driver side. On the passenger side, a single omnidirectional microphone is typically provided for sound gathering. Potentially, two omnidirectional microphones are provided above the second row of seats, of the same design as those above the passenger seat. These microphones are often equipped with active noise control for input audio.

The present background is provided as illustrative environmental context only. It will be readily apparent to those of ordinary skill in the art that the concepts and principles of the present disclosure may be implemented in other environmental contexts equally.

BRIEF SUMMARY

The present disclosure provides an active noise cancellation solution based on the use of predefined audio models delivered in a spatial configuration with the addition of the contextualization of sensory data collected from a vehicle and predictive calculations related to its immediate, near, and far surroundings. This significantly reduces the noise level present in the cabin of the vehicle and enables control of the noise level individually for the occupants of the vehicle. The predefined audio models are pre-calculated anti-sounds, cancelling the experienced and expected noise models, executed via the software stack and delivered in a targeted manner through the existing audio speakers of the vehicle. The systems and methods of the present disclosure are configured to deliver spatial audio, to create a personal quiet zone around the head of a driver and/or a passenger. Thus, individually-tailored cancelling audio waveforms are delivered to reduce noise from external sources, such as tires, engine, wind, nearby traffic, outside environment, etc. The present disclosure delivers a smart, improved, updatable solution for cancelling audio waveform spatial delivery, where each occupant is tracked and placed within an audio "sphere" where acoustics are delivered in relation to the surroundings to cancel noise given the direction of its origin.

In one illustrative embodiment, the present disclosure provides a vehicle noise cancellation system, including: memory storing instructions executed by a processor for receiving local contextual information affecting a soundwave present in a vehicle; memory storing instructions executed by the processor for receiving remote contextual information affecting the soundwave present in the vehicle; memory storing instructions executed by the processor for receiving vehicle occupant information; a machine learning algorithm executed by the processor for processing the local contextual information, the remote contextual information, and the vehicle occupant information to generate an augmented anti-soundwave; and a speaker disposed in the vehicle for delivering the augmented anti-soundwave to an occupant of the vehicle to mitigate the soundwave present in the vehicle. The machine learning algorithm executed by the processor for processing the local contextual information, the remote contextual information, and the vehicle occupant information to generate the augmented anti-soundwave includes a machine learning algorithm executed by the processor for processing the local contextual information, the remote contextual information, and the vehicle occupant information to generate a first augmented anti-soundwave specific to a first zone of the vehicle and a second augmented anti-soundwave specific to a second zone of the vehicle; and the speaker disposed in the vehicle for delivering the augmented anti-soundwave to the occupant of the vehicle to mitigate the soundwave present in the vehicle includes a plurality of speakers disposed in the vehicle for delivering the first augmented anti-soundwave to an occupant present in the first zone of the vehicle and delivering the second augmented anti-soundwave to an occupant present in the second zone of the vehicle. The local contextual information includes one or more of: exterior sensor information related to surroundings of the vehicle, exterior camera information related to surroundings of the vehicle, vehicle behavior information, interior camera information related to vehicle configuration, interior microphone information related to vehicle interior and/or exterior noise, speed data, vehicle configuration data, vehicle operating state data, and a vehicle noise model. The remote contextual information includes one or more of: object information related to surroundings of the vehicle, geoposition data, traffic data, road surface data, roadwork information, weather information, and a vehicle noise model. The vehicle occupant information includes interior camera information related to vehicle occupant position and movement and interior microphone information related to vehicle occupant noise. The interior camera information related to the vehicle occupant position and movement includes interior camera information related to vehicle occupant head position and movement.

In another illustrative embodiment, the present disclosure provides a vehicle noise cancellation method, including: receiving local contextual information affecting a soundwave present in a vehicle; receiving remote contextual information affecting the soundwave present in the vehicle; receiving vehicle occupant information; processing the local contextual information, the remote contextual information, and the vehicle occupant information to generate an augmented anti-soundwave; and delivering the augmented anti-soundwave to an occupant of the vehicle to mitigate the soundwave present in the vehicle. Processing the local contextual information, the remote contextual information, and the vehicle occupant information to generate the augmented anti-soundwave includes processing the local contextual information, the remote contextual information, and the vehicle occupant information to generate a first augmented anti-soundwave specific to a first zone of the vehicle and a second augmented anti-soundwave specific to a second zone of the vehicle; and delivering the augmented anti-soundwave to the occupant of the vehicle to mitigate the soundwave present in the vehicle includes delivering the first augmented anti-soundwave to an occupant present in the first zone of the vehicle and delivering the second augmented anti-soundwave to an occupant present in the second zone of the vehicle. The local contextual information includes one or more of: exterior sensor information related to surroundings of the vehicle, exterior camera information related to surroundings of the vehicle, vehicle behavior information, interior camera information related to vehicle configuration, interior microphone information related to vehicle interior and/or exterior noise, speed data, vehicle configuration data, vehicle operating state data, and a vehicle noise model. The remote contextual information includes one or more of: object information related to surroundings of the vehicle, geoposition data, traffic data, road surface data, roadwork information, weather information, and a vehicle noise model. The vehicle occupant information includes interior camera information related to vehicle occupant position and movement and interior microphone information related to vehicle occupant noise. The interior camera information related to the vehicle occupant position and movement includes interior camera information related to vehicle occupant head position and movement. Processing the local contextual information, the remote contextual information, and the vehicle occupant information to generate the augmented anti-soundwave includes processing the local contextual information, the remote contextual information, and the vehicle occupant information using a machine learning algorithm trained on a training dataset.

In a further illustrative embodiment, the present disclosure provides a non-transitory computer-readable medium including instructions stored in a memory and executed by a processor to carry out the vehicle noise cancellation steps including: receiving local contextual information affecting a soundwave present in a vehicle; receiving remote contextual information affecting the soundwave present in the vehicle; receiving vehicle occupant information; processing the local contextual information, the remote contextual information, and the vehicle occupant information to generate an augmented anti-soundwave; and delivering the augmented anti-soundwave to an occupant of the vehicle to mitigate the soundwave present in the vehicle. Processing the local contextual information, the remote contextual information, and the vehicle occupant information to generate the augmented anti-soundwave includes processing the local contextual information, the remote contextual information, and the vehicle occupant information to generate a first augmented anti-soundwave specific to a first zone of the vehicle and a second augmented anti-soundwave specific to a second zone of the vehicle; and delivering the augmented anti-soundwave to the occupant of the vehicle to mitigate the soundwave present in the vehicle includes delivering the first augmented anti-soundwave to an occupant present in the first zone of the vehicle and delivering the second augmented anti-soundwave to an occupant present in the second zone of the vehicle. The local contextual information includes one or more of: exterior sensor information related to surroundings of the vehicle, exterior camera information related to surroundings of the vehicle, vehicle behavior information, interior camera information related to vehicle configuration, interior microphone information related to vehicle interior and/or exterior noise, speed data, vehicle configuration data, vehicle operating state data, and a vehicle noise model. The remote contextual information includes one or more of: object information related to surroundings of the vehicle, geoposition data, traffic data, road surface data, roadwork information, weather information, and a vehicle noise model. The vehicle occupant information includes interior camera information related to vehicle occupant position and movement and interior microphone information related to vehicle occupant noise. The interior camera information related to the vehicle occupant position and movement includes interior camera information related to vehicle occupant head position and movement. Processing the local contextual information, the remote contextual information, and the vehicle occupant information to generate the augmented anti-soundwave includes processing the local contextual information, the remote contextual information, and the vehicle occupant information using a machine learning algorithm trained on a training dataset.

BRIEF DESCRIPTION OF THE DRAWINGS

The present disclosure is illustrated and described with reference to the various drawings, in which like reference numbers are used to denote like system components/method steps, as appropriate, and in which.

DETAILED DESCRIPTION

Figure 1:
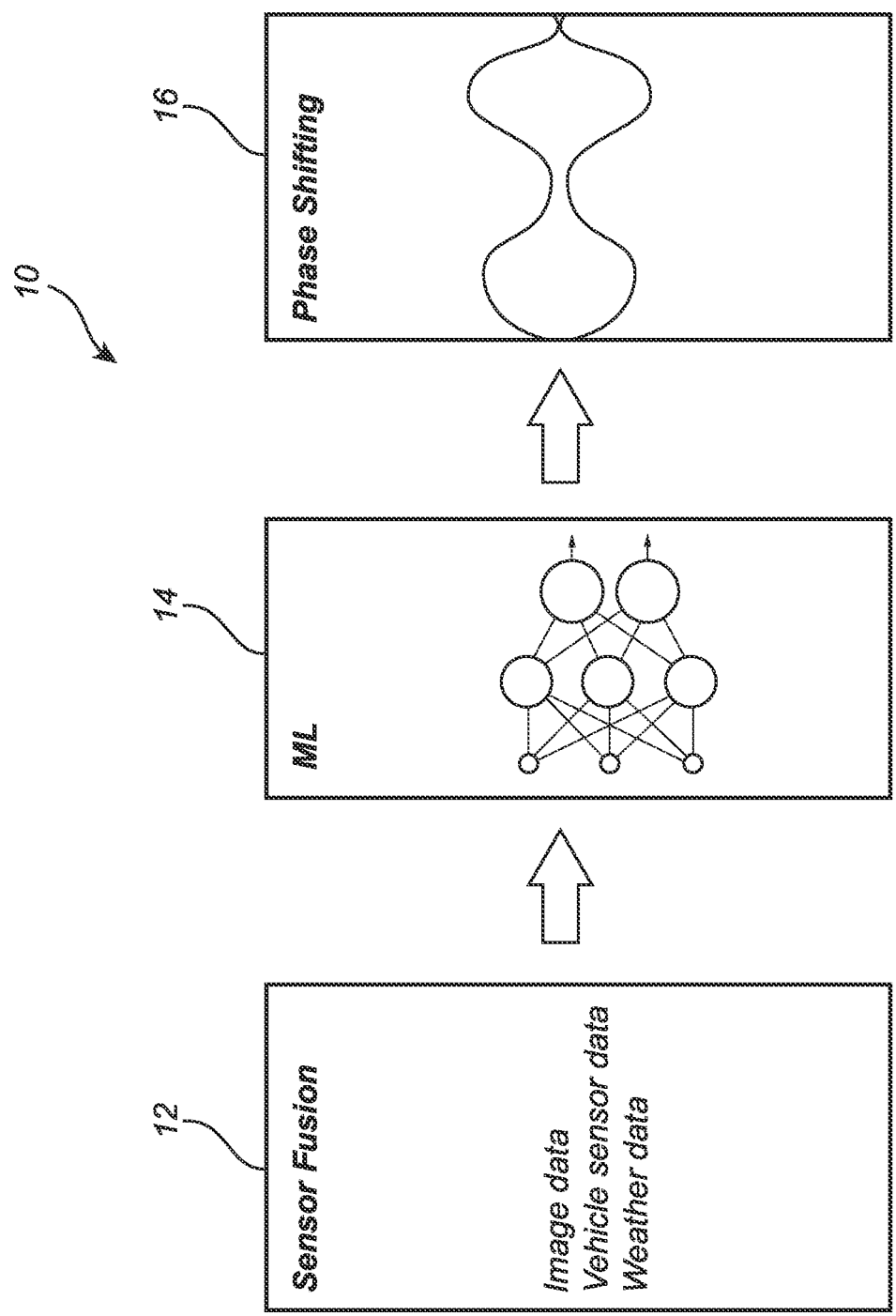
FIG. 1 is a schematic diagram illustrating a sensor information flow for the generation of anti-sound for noise cancellation using the vehicle noise cancellation system and method of the present disclosure.

Again, the present disclosure provides an active noise cancellation solution based on the use of predefined audio models delivered in a spatial configuration with the addition of the contextualization of sensory data collected from a vehicle and predictive calculations related to its immediate, near, and far surroundings. This significantly reduces the noise level present in the cabin of the vehicle and enables control of the noise level individually for the occupants of the vehicle. The predefined audio models are pre-calculated anti-sounds, cancelling the experienced and expected noise models, executed via the software stack and delivered in a targeted manner through the existing audio speakers of the vehicle. The systems and methods of the present disclosure are configured to deliver spatial audio, to create a personal quiet zone around the head of a driver and/or a passenger. Thus, individually-tailored cancelling audio waveforms are delivered to reduce noise from external sources, such as tires, engine, wind, nearby traffic, outside environment, etc. The present disclosure delivers a smart, improved, updatable solution for cancelling audio waveform spatial delivery, where each occupant is tracked and placed within an audio "sphere" where acoustics are delivered in relation to the surroundings to cancel noise given the direction of its origin.

Stated differently, the architecture of the present disclosure, implemented via processors, memory, software, perception and other sensor suites, speakers, and microphones coupled to a vehicle, utilizes local observed information, external (i.e., predictive) information, vehicle information, and occupant (i.e., position) information to assess observed and expected noise within the cabin of a vehicle, formulate effective anti-noise on a zone-by-zone basis, and target the application of this anti-noise to enhance the noise level comfort of the driver and each passenger on an individualized basis. Thus, things like observed and expected speed, road noise, traffic, weather, environmental conditions, and the like are considered to formulate noise cancelling waveforms in nanoseconds, which may then be delivered to each occupant in an individualized and targeted manner. Delivery triangulation is achieved using the speakers of the vehicle. Tailored anti-sounds are delivered near the ear(s) of each occupant at precisely the right time, and each occupant is tracked to make sure that this situation persists. The while system is adaptive, with observations and predictions continually being updated and fed back.

This far surpasses conventional headphone systems that simply apply noise cancellation waveforms based on local observations and vehicle systems that generally apply noise cancellation waveforms based on local observations with the application of some rudimentary assumptive models and possibly gross feedback adjustment, all on a non-targeted, single-zone, non-adaptive basis.

The noise cancellation setup is defined for occupants in a moving enclosed space, the cabin of the vehicle. The interior has a speaker configuration to accommodate spatial audio playback. The interior further has observational cameras that track the placement of each occupant and the gaze and placement of each occupant's head, in particular the placement of the ears in relation to the speakers. Further, the interior has microphones placed in relative vicinity to the occupants. The vehicle has connectivity and receives contextual information about its near vicinity from external sources, this being descriptions of weather, traffic, road condition, road material composition, ongoing roadwork, etc. The vehicle gathers contextual information from its immediate surroundings through sensors and cameras in the external body, mapping semantic descriptions through recordings. Inputs to the solution include, but are not limited to: the contextualization of the surroundings (i.e., the immediate surroundings); an understanding of the composition of road material (e.g., asphalt, gravel, etc.); the wheel noise; the noise generated from exterior airflow on the body of the vehicle at a given speed; an understanding of the vehicle's interior configuration; the placement of the microphones in relation to the speakers; the speakers' placement; the ability to project sound at given points in space; and the ability to track the placement and angle of gaze of the occupants.

The augmentation of digital objects in this text refers to placing digital objects in the real world in relation to real world objects. The ability to enhance the real world with additional information can be obtained by the person in their vicinity. The use of audio in relation to the real world and placement of the audio at a given distance from the real world objects is what is referred to as augmented reality.

The signals collected from the vehicle, input from near and far surroundings, in conjunction with predefined representations of sound, make up the basis for machine learning datasets to train and execute new waveform generation and/or selection of the best matched. These new/selected waveforms are used as cancelling waveforms played in triangulation to accommodate noise cancellation for a given spatial area. This represents augmentation as the result of sensor fusion. The observation of surroundings by the vehicle cameras, sensors, and interior microphones make up the immediate surrounding information. Furthermore, the anti-sound is selected and built by a machine learning model where the input from the immediate and far surroundings used as input, and the pre-recorded matched audio waves are output. Training data is recorded and categorized by input such as: far surrounding information relating to road conditions; weather conditions and surrounding traffic conditions; local surrounding information, such as sounds observed by the microphone; video input by cameras and other sensors; mapping meeting vehicles; vehicles passing; road conditions; etc. The vehicle behavior and recorded noise sets are handled as historical information that applies to the vehicle noise reduction modeling. The current state of the vehicle, internal noise, its speed, its immediate surroundings, and the far surroundings dataset from weather conditions, road conditions, and the like are used to create a noise cancelation frequency set to send out in the given location with respect to ears on the head of the driver or passenger.

The solution of the present disclosure provides a dynamic software integration that, in contrast to existing solutions, is driven by a combination of vehicle sensor and descriptive data in concert with external cloud sources for the prediction of impact. This solution is different from existing passive and active noise cancellation solutions in that it combines and derives enhanced capabilities from multiple data sources for spatial anti-noise delivery ubiquitously in a vehicle.

The noise cancellation setup of the present disclosure is defined for occupants in a moving enclosed space, i.e., the cabin of a vehicle; where the interior includes a speaker configuration to accommodate spatial audio playback. The interior further has observational cameras or other perception sensors that track the position of each occupant and the gaze and position of each occupant's head—in particular, the position and orientation of the ears in relation to the speakers. Further, the interior has microphones placed in relative vicinity to the occupants.

The vehicle has connectivity and receives contextual information about its near vicinity from external sources, this being, for example, descriptions of weather, traffic, road condition, road material composition, and ongoing roadwork. The vehicle gathers contextual information from its immediate surroundings through sensors and cameras in the external body, mapping semantic descriptions through recordings.

The contextualization of the surroundings, understanding of the composition of road material, wheel noise, noise generated from exterior airflow on the body of the vehicle at a given speed, understanding of the vehicle's interior configuration, placement of the microphones in relation to the speakers, speaker placement and ability to project sound at given points in space, ability to track the placement and angle of the gazes of the occupants, and the like are parameters for input to the solution.

The signals collected from the vehicle and input from the surroundings, in conjunction with pre-defined representations of sound, form the basis for machine learning datasets to train and execute new waveform generation and/or selection of the best matched. These new/selected waveforms are used as cancelling waveforms played in triangulation to accommodate a noise cancellation for a given spatial area. This represents augmentation as a result of sensor fusion. The observation of surroundings by the vehicle cameras, sensors, and interior microphones make up the immediate surrounding information. Furthermore, the anti-sound is selected and built by a machine learning model where the input from the surroundings is used as input, and the pre-recorded matched audio waves are output. Training data is recorded and categorized by input. The vehicle behavior and recorded noise sets are handled as historical information that applies to the vehicle noise reduction modeling. The current state of the vehicle, internal noise, speed, immediate surroundings, far surroundings, weather conditions, road conditions, etc. are used to create a noise cancelation frequency set to send out in a given location related to the ears on the head of the driver or occupant.

FIG. 1 is a schematic diagram illustrating a sensor information flow 10 for the generation of anti-sound for noise cancellation using the vehicle noise cancellation system and method of the present disclosure. This sensor information flow 10 includes generating a sensor fusion 12 of image data, vehicle sensor data, weather data, and the like, which is then used as input to a machine learning algorithm 14 that generates an anti-noise waveform for phase shifting 16.

Figure 2:
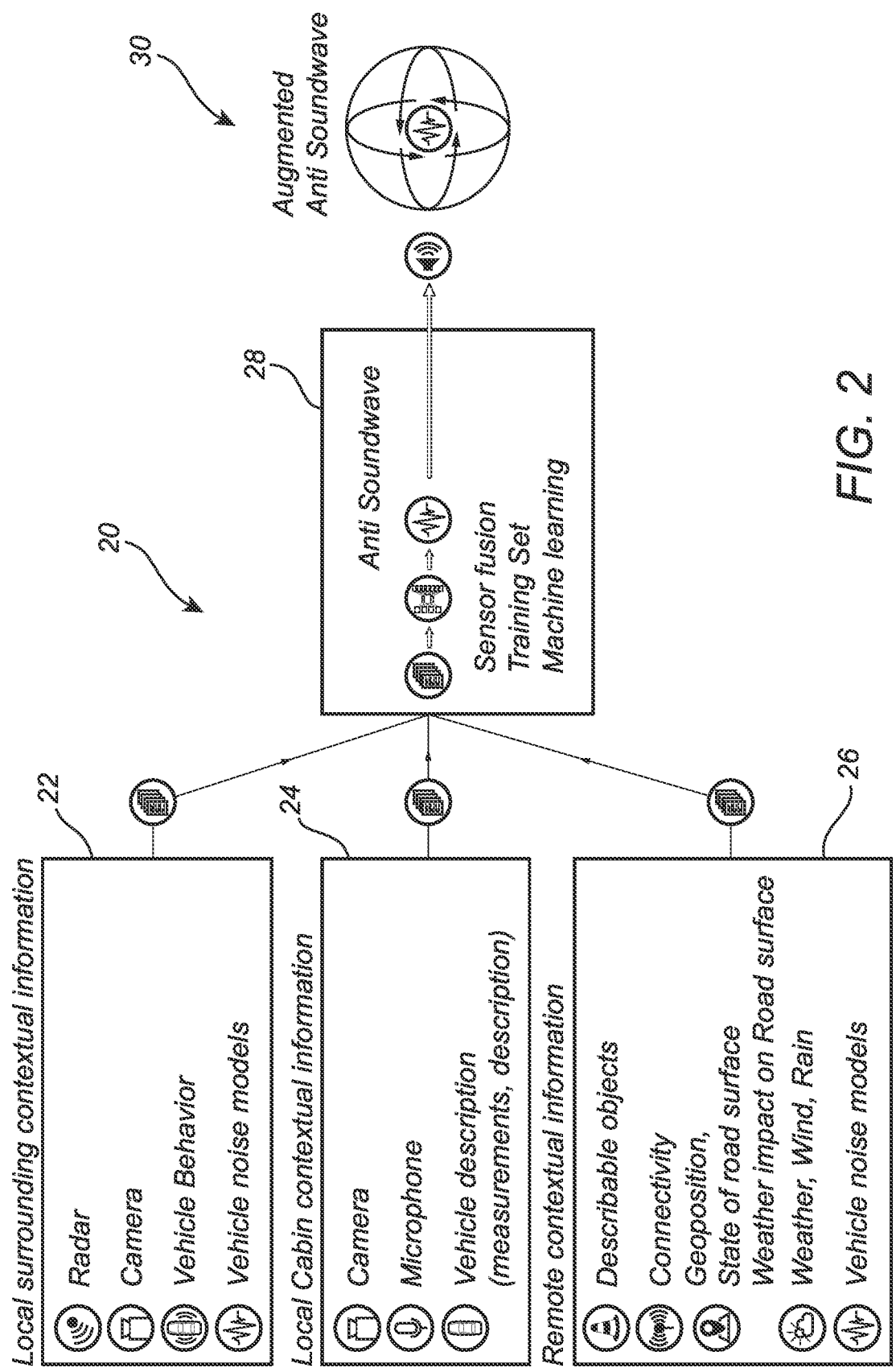
FIG. 2 is a schematic diagram illustrating a portion of one embodiment of the vehicle noise cancellation method of the present disclosure, where input signals from various sources are used for the generation of anti-sound that is subsequently delivered spatially.

FIG. 2 is a schematic diagram illustrating a portion of one embodiment of the vehicle noise cancellation method 20 of the present disclosure, where input signals from various sources are used for the generation of anti-sound that is subsequently delivered spatially. Inputs are derived from local surrounding contextual information 22, such as sensor information, camera information, vehicle behavior information, and vehicle noise models. Inputs are also derived from local cabin contextual information 24, such as camera information, microphone information, and vehicle description information. Inputs are further derived from remote contextual information 26, such as describable object information, connectivity information, geoposition information, road surface information, weather information, and vehicle noise models. All these inputs are fused and processed by the machine learning algorithm 28 operating based on formulated training sets to generate the augmented anti-sound wave 30 that is ultimately delivered to the ears of occupants in the cabin of the vehicle, preferably on a zone-by-zone or individualized basis.

Figure 3:
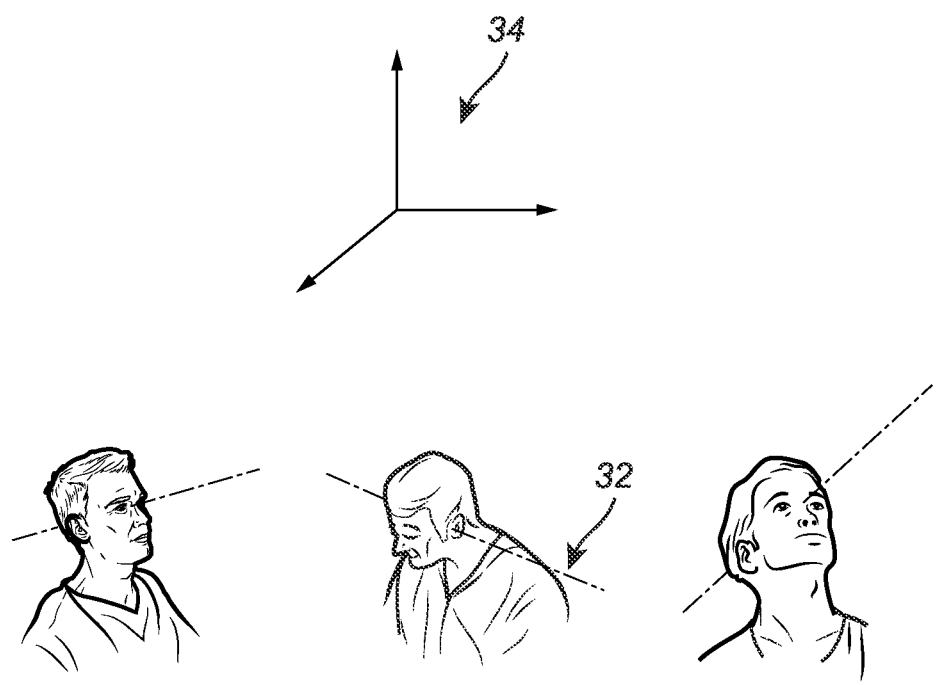
FIG. 3 is a schematic diagram illustrating the use of an extended gaze algorithm to track a vehicle occupant's ears in the defined vehicle audio space such that augmented anti-noise can be delivered in a targeted manner in accordance with the vehicle noise cancellation systems and methods of the present disclosure.

FIG. 3 is a schematic diagram illustrating the use of an extended gaze algorithm, well known to those of ordinary skill in the art, to track a vehicle occupant's ears in the defined vehicle audio space such that augmented anti-noise can be delivered in a targeted manner in accordance with the vehicle noise cancellation systems and methods of the present disclosure. In a scenario where the occupant is driving the vehicle, for example, the driver monitoring camera that is tracking the driver's gaze is keeping track of the position of and angle of the head (and thus the ears) 32 in relation to the camera and an orthogonal frame of reference 34. This gaze tracking is used to determine the distance of the head (and thus the ears) in relation to the placement of the camera. The placement of each ear of the driver in relation to the gaze is used for placement and direction of the subsequent spatial audio delivery.

The audio system setup of the present disclosure is configured to deliver the sound objects with accuracy within the defined confines of the vehicle interior. The spatial audio configuration based on an array of speakers is defined in a way that allows for sound objects to be delivered with relative accuracy over the distance from the source to a given place in space. The sound object acts as an augmentation of the placement of the sound inside the described space of the interior of the vehicle, for reference, a visual representation in relation to a physical object is often described as augmented reality or mixed reality and uses spatial anchors to determine their three-dimensional representation in relation to real world objects, and these spatial audio objects are represented in the same manner with sound properties. The noise cancellation acts as a cone-of-silence for the driver, for example, tracking the driver's gaze to ensure that the audio cancelation waves are placed in the vicinity of the driver's ears at all times. Any obstructions in the interior are mapped and accounted for to deliver the best possible audio experience. The constellation of the speakers and the pre-processing of the noise cancelling sound waves in conjunction with the input from the interior microphones and interior camera to place the delivery of the audio provides the enhanced audio experience.

The noise cancellation can be set to cancel out noise derived from sounds exterior to the vehicle, to noise that emanates from internal noise sources, and/or to enhance exterior noise that might demand the driver's attention. With the directional capability of spatial audio, the enhancement can support driver attention in a directional manner.

Figure 4:
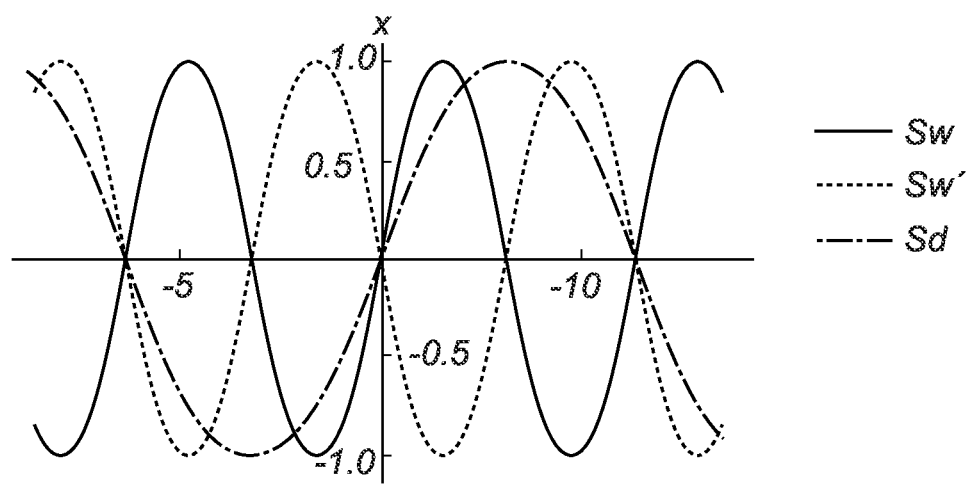
FIG. 4 is a plot illustrating the augmentation of sound (Sw) with anti-sound (Sw') to form enhanced sound (Sd) that is desired to be heard.
Figure 4:
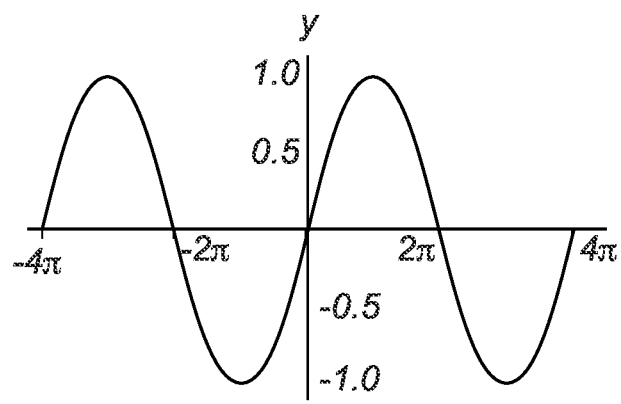

FIG. 4 is a plot illustrating the augmentation of sound (Sw) with anti-sound (Sw') to form enhanced sound (Sd) that is desired to be heard.

In a scenario where the occupant is a passenger in the vehicle, the cabin monitoring camera and/or frequency-based interior tracking tracks the seating position and posture of the passenger. The distance of the head from the camera and the degree of accuracy of the passenger position and angle of the head in relation to the camera gives a gaze tracking that enables the placement of each ear of the passenger in relation to audio source used for placement and direction of the spatial audio sound delivery. The audio system setup is configured to deliver the sound objects with accuracy within the defined confines of the vehicle interior. The spatial audio configuration based on an array of speakers is defined in a way that allows for sound objects to be delivered with relative accuracy to the distance from the source to represent a given place in space. The passenger experiences a ball of silence, virtually placed around their head, that is tracked and moves with their head movement. The noise cancellation can be set to cancel out noise derived from sounds generated outside to the vehicle (e.g., road friction, wind, rain, other vehicles, bad asphalt), and noise that derives from internal noise sources (e.g., conversations, music, loud noises), or to enhance interior noises (e.g., conversations with another row of seats or a conversation between two occupants not sitting adjacent to one another) or exterior noises that might be of value for the passenger (e.g., conversations with external persons, landmark placement, advertisement). The use of audio queues can be used to drive attention of the occupant when needed.

The representational model of the exterior of the vehicle is used to define a set of waveforms that represent wind at certain speeds in given weather, as a baseline for real time calculations. Further, interior noise and noise from hardware, such as engines and wheel wells and wheels on surfaces, is pre-recorded and stored as waveforms. Noise models for the impact of wind, rain, dry roads, wet roads, icy roads, etc. on the vehicle's exterior are pre-recorded from the interior as audio models. In concert with the contextualization of the surroundings, this being the understanding of the material of the road currently being driven on, the wheel noise, the noise generated from exterior airflow on the body of the vehicle at a given speed, etc., this makes up the core waveforms for the noise cancellation. Further, the immediate surroundings noise impact, such as passing vehicles and other obstacles, are mapped real time by the vehicle's exterior sensors and cameras and the impact is mapped to the waveform for noise cancellation.

The understanding of the vehicle's interior configuration, placement of the microphones in relation to the speakers, the speaker placement, the ability to project sound at given points in space, and the ability to track the placement and angle of gaze of the occupants are the given parameters for the delivery of the noise cancellation.

The constellation of the speakers, placement of the internal cameras, microphones, external cameras, and ultrasound sensors, in tandem with the latency of the semantic description of the immediate surroundings are the key factors in delivering the noise cancellation.

The accuracy of delivering a personal noise cancellation is determined by a general capability to deliver spatial audio with high degree of spatial alignment. General spatial audio has a relative relation to accuracy in placing audio objects in a space. With the tracking of the occupant, and an understanding of the angle and direction of their ears, the ability to both place a sound at a location and maintain its location detached from the motion of the head of the occupant is possible, while the ability to attach the object to the motion of the head, much like a set of virtual headphones, is possible with a high degree of spatial alignment. This enables the possibility to maintain the noise cancellation as a personal experience for multiple participants occupying the same space.

Figure 5:
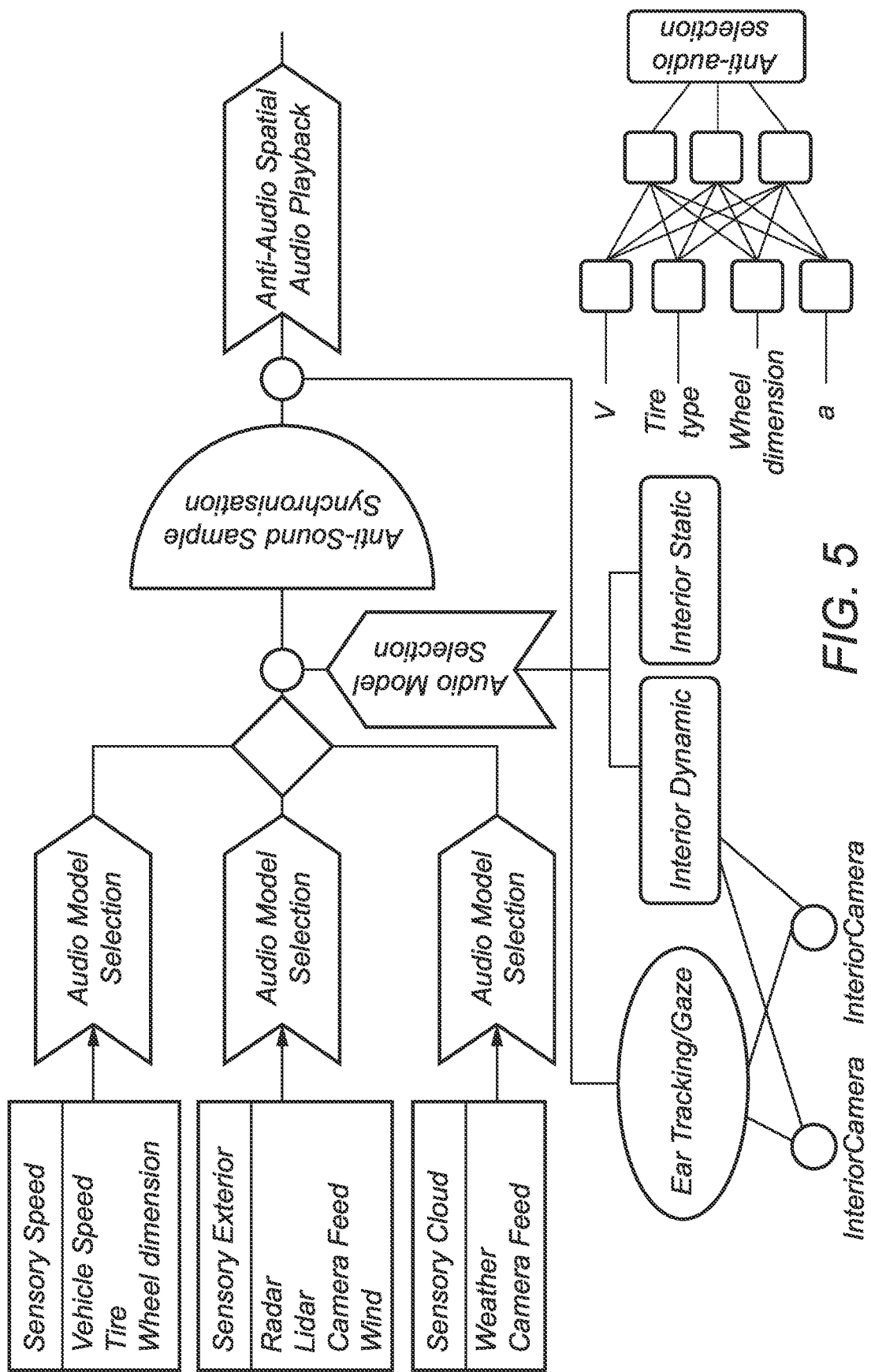
FIG. 5 is a schematic diagram illustrating a detailed flow of input handling for anti-sound creation in accordance with the vehicle noise cancellation systems and methods of the present disclosure.

Noise cancellation in a moving vehicle using spatial audio functionality with semantic understanding of the far, near, and immediate surrounding has the following illustrative base setup (with a driver zone focus):
  Focus on driver cone or ball of silence
  Head position and ear alignment with speakers for sonic directional noise cancelling
  External vehicle effect and signals
  Pre-Defined Model(s):
  Aerodynamics of vehicle (noise value of speed applied to body)
  Engine noise (rev and torque of engine)
  HVAC fans and airflow (model of HVAC sound effect on interior)
  Wheel/Tire (wheel to asphalt/ground sound model, generalized)
  Low/High frequency sound from system (sound model for any electrical systems)
  In Cabin Effect and Signals (Input):
  Observation of person (head position and ear alignment)
  Observation of sound in cabin (sound input from driver microphone, sound input from other cabin microphones)
  Static Information Description:
  Interior volume of model, space of interior, defined by 3D model containing placement of cameras, placement of microphones, placement of speakers, placement of obstruction objects, such as placement of seats, other occupants, current position of seats
  Noise Cancellation Output:
  Sound in all speakers that handles noise cancelling in alignment with driver's ears. Speakers are defined on a node level, where each speaker can output sound individually to accommodate triangulation of sound delivery FIG. 5 illustrates a detailed flow of input handling for anti-sound creation in accordance with the vehicle noise cancellation systems and methods of the present disclosure, with the various blocks summarized in Table 1 below:

TABLE 1

| | Input handling for anti-sound creation |
|---|---|
| 1 | Local module that must be executed at vehicle |
| 2a | Remote signals that can be used as a model if available and trusted Signals that are optionally used for enhancement if available and trusted |
| 3a | Determine vehicle externally and internally generated noise model related to the speed of the vehicle Best matched and determined anti-noise representation |
| 3a, b | Machine learning model to predict anti-sound wave pattern |
| 3b | Determine vehicle externally and internally generated noise model related to the speed of the vehicle Best matched and determined anti-noise representation |
| 3c | Optionally determined remote contextual information relating to near vehicle observations |
| 4 | Best matched and determined anti-noise representation of combined sensory input |
| 5, 6 | Observation of interior cabin state, determining placement of occupants, recording of interior sound, determining placement of ears in relation to speakers used for placement of delivering anti-noise |
| 7 | Data at this stage contains: observation of interior cabin state recording of interior sound placement of objects placement of occupants' ears relating to speaker positions externally and internally generated noise related to speed optional determined contextual information, e.g., sensory cloud |
| 8 | Observation of interior cabin state, determining placement of occupants' ears in relation to speakers used for placement of delivering anti-noise |
| 9 | Delivery of the constructed anti-noise at given spatial placement in relation to ears to cancel noise at the exact time. |

The description of a solution focused on one occupant is based on a combination of static noise cancellation hardware, speaker placement, speaker articulation, smart sound models, and dynamic input. The prerequisite for the single passenger implementation is based on the system having a defined capability to run complex algorithms to implement cancelling waveform calculations for a given defined area inside the cabin. The vehicle is equipped with or provides a driver monitoring camera (placed to observe the driver), a constellation of microphones that can record the cabin noise (e.g., the microphone for in-cabin calls), telematics that constantly observe GPS for calculated speed (i.e., global speed), vehicle signals that generate the local speed (i.e., the speed observed by the vehicle independently), an articulated model of the interior (i.e., the spatial model of the vehicle), and vehicle signals of the current placement of movable objects (and any alterations to movable objects, such as seats, recorded with exposed vehicle signals). Further, the model is expanded with the external near surroundings, a front facing camera for road observations, and cameras observing the surroundings and translating them into a semantic model of the environment. A defined tire-to-road model is also used, along with a model of tire-at-speed audio, road surface quality of the asphalt, a generalized model, an asphalt sound model for tire sound (fine, worn, cement), sounds models for engine noise and the behavior of mechanics, sound models for the vehicle body at givens speeds of air flow, and the like. The inputs from the various sound models are processed to deliver an anti-sound to cancel the sound in the environment in a short time in a given vicinity of the occupants' ears, thereby creating a zone of silence near their ears.

Figure 6:
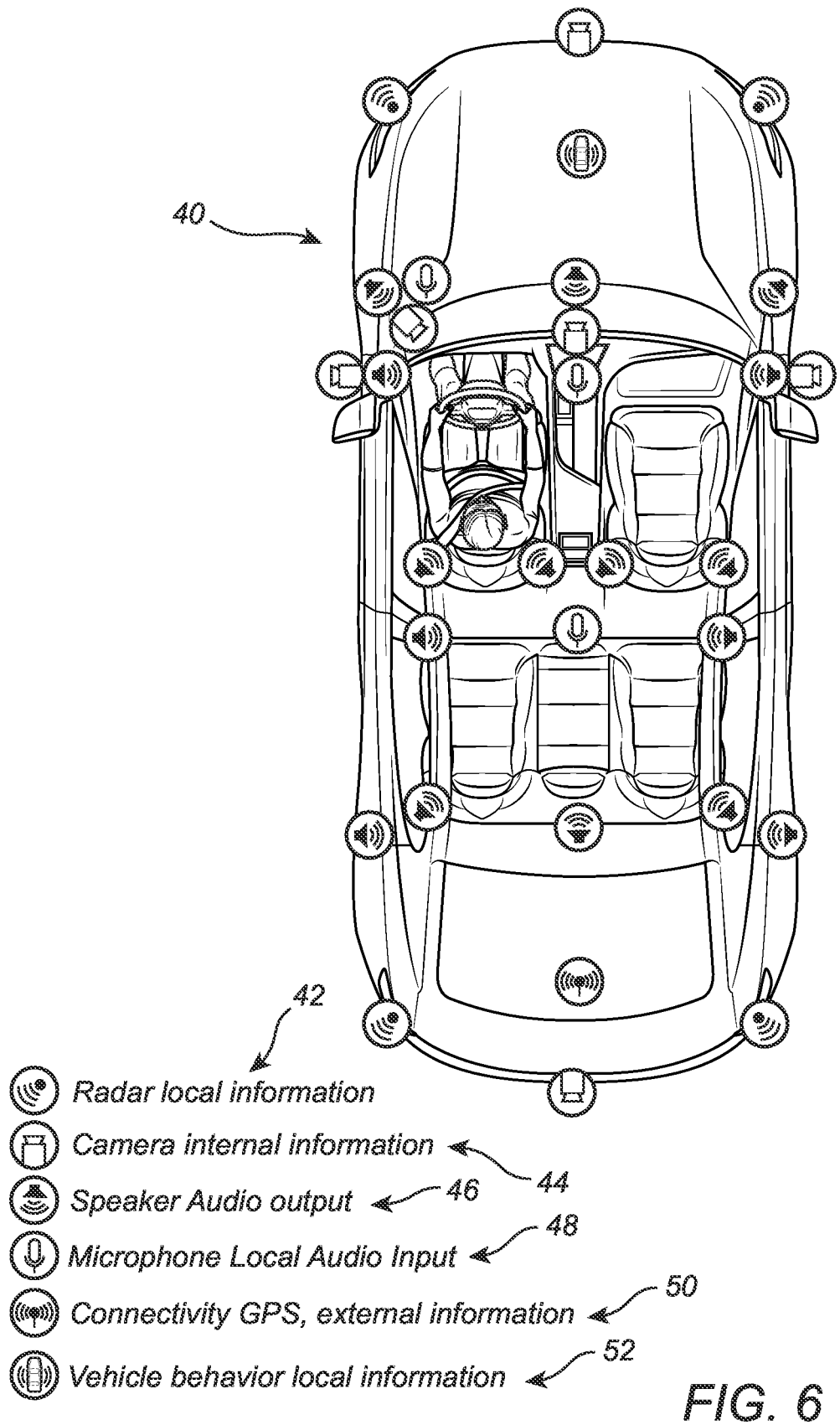
FIG. 6 is a schematic diagram illustrating one embodiment of the vehicle noise cancellation system functionality of the present disclosure implemented in a vehicle with a single occupant.

FIG. 6 is a schematic diagram illustrating one embodiment of the vehicle noise cancellation system functionality of the present disclosure implemented in a vehicle with a single occupant. The system 40 generally includes variously disposed local sensors 42, perception sensors 44, speakers 46, microphones 48, external connectivity links 50, and local monitors 52. Audio zones are defined for each occupant, with a focus on the driver zone here. Input signals are obtained from internal microphones. Each speaker is its own articulatable node and can be individually driven, providing individual output. A 3D CAD representation of the vehicle is utilized, highlighted the interior dimensions of the vehicle. Vehicle signals are utilized related to occupant presence and the placement of all seats in the vehicle, and the history of placement in relation to the 3D CAD representation, providing the placement of each speaker in relation to current place of each seat. Telematics related to the speed of the vehicle are also utilized. A 3D CAD model of the exterior of the vehicle is utilized, including an aerodynamic model of wind noise of flow at a given speed. Pre-calculated audio for noise reduction of current software driven noise cancellation (i.e., static model calculations) are utilized. The driver monitoring camera is utilized for its gaze tracking capability, mapping the driver head placement in relation to the speakers, and the orientation of the driver's ears. Geopositioning is provided through telematics and map data. Finally, road quality data and a linked pre-defined audio library are used for waveform calculation.

The description of a solution for multiple occupants is again based on a combination of static noise cancellation hardware, speaker placement, speaker articulation, smart sound models, and dynamic input. The prerequisite for the multiple passenger implementation is based on the system having a defined capability to run complex algorithms to implement cancelling waveform calculations for multiple given defined area inside the cabin. The vehicle is equipped with or provides a driver monitoring camera (placed to observe the driver), passenger monitoring cameras (placed to observe the passengers), a constellation of microphones that can record the cabin noise (e.g., the microphone for in-cabin calls), telematics that constantly observe GPS for calculated speed (i.e., global speed), vehicle signals that generate the local speed (i.e., the speed observed by the vehicle independently), an articulated model of the interior (i.e., the spatial model of the vehicle), and vehicle signals of the current placement of movable objects (and any alterations to movable objects, such as seats, recorded with exposed vehicle signals). Further, the model is expanded with the external near surroundings, a front facing camera for road observations, and cameras observing the surroundings and translating them into a semantic model of the environment. A defined tire-to-road model is also used, along with a model of tire-at-speed audio, road surface quality of the asphalt, a generalized model, an asphalt sound model for tire sound (fine, worn, cement), sounds models for engine noise and the behavior of mechanics, sound models for the vehicle body at givens speeds of air flow, and the like. The inputs from the various sound models are processed to deliver an anti-sound to cancel the sound in the environment in a short time in a given vicinity of the occupants' ears, thereby creating a zone of silence near their ears. Here, to account for multiple passengers, the implementation of observational cameras for the cabin that can trace the passengers' head movement allows for placing and tracing their ears in space. A cabin omni camera with gaze tracking capability that maps the passengers' heads and direction of passengers' ears both for the front and rear seat or in the given seating constellation for all passengers is necessary. The control of this audio space allows the occupants to be isolated from other near vicinity noise even internally in the cabin. A conversation near their place of seating can be cancelled out by the noise cancellation system. Alternatively, sounds that are of value can be amplified and augmented to give each occupant an enhancement. For example, a passenger seated in the front seat can have a private conversation with a passenger in the back seat.

Figure 7:
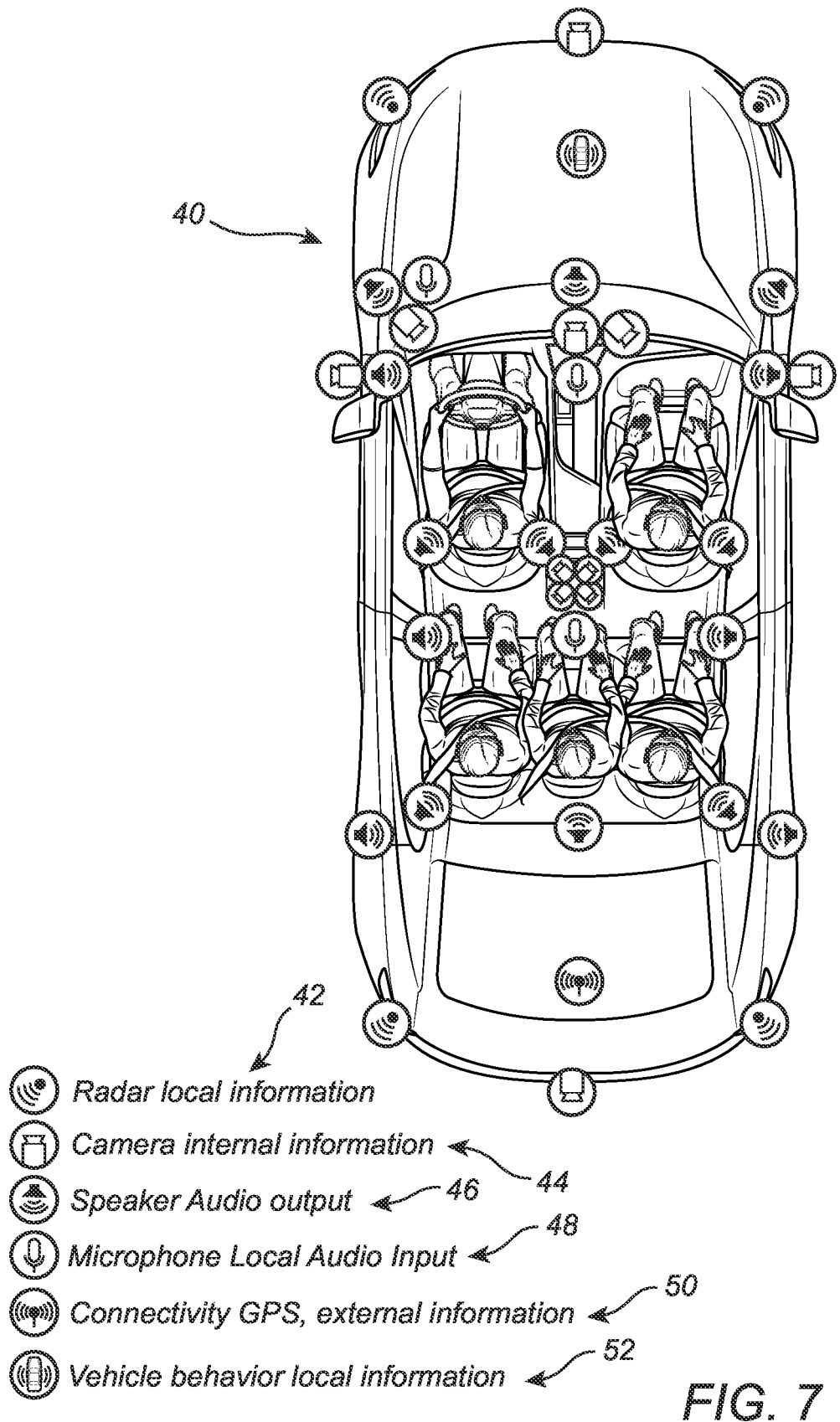
FIG. 7 is a schematic diagram illustrating one embodiment of the vehicle noise cancellation system functionality of the present disclosure implemented in a vehicle with multiple occupants.

FIG. 7 is a schematic diagram illustrating one embodiment of the vehicle noise cancellation system functionality of the present disclosure implemented in a vehicle with a single occupant. The system again 40 generally includes variously disposed local sensors 42, perception sensors 44, speakers 46, microphones 48, external connectivity links 50, and local monitors 52, although in a slightly different configuration than in the embodiment above. Audio zones are defined for each occupant, with a focus on multiple zones here. Input signals are obtained from internal microphones. Each speaker is its own articulatable node and can be individually driven, providing individual output. A 3D CAD representation of the vehicle is utilized, highlighted the interior dimensions of the vehicle. Vehicle signals are utilized related to occupant presence and the placement of all seats in the vehicle, and the history of placement in relation to the 3D CAD representation, providing the placement of each speaker in relation to current place of each seat. Telematics related to the speed of the vehicle are also utilized. A 3D CAD model of the exterior of the vehicle is utilized, including an aerodynamic model of wind noise of flow at a given speed. Pre-calculated audio for noise reduction of current software driven noise cancellation (i.e., static model calculations) are utilized. The driver monitoring camera is utilized for its gaze tracking capability, mapping the driver head placement in relation to the speakers, and the orientation of the driver's ears. Geopositioning is provided through telematics and map data. Finally, road quality data and a linked pre-defined audio library are used for waveform calculation. Here, the camera used may be a cabin omni camera, and observables such as lane detection, vehicle detection, and object detection may of course be used to establish and account for an augmented noise model.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 8:
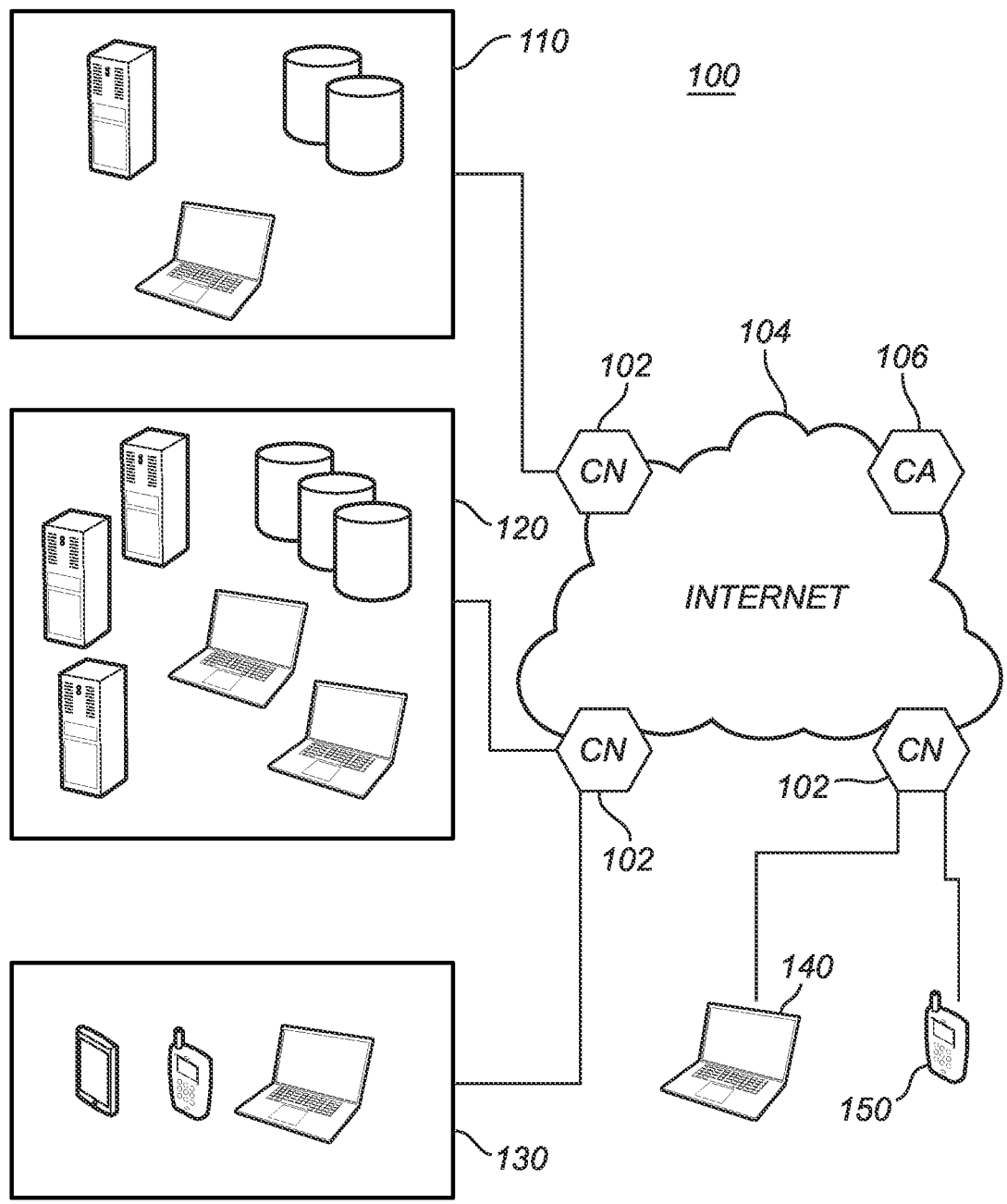
FIG. 8 is a network diagram of a cloud-based system for implementing the various systems and methods of the present disclosure.
Figure 9:
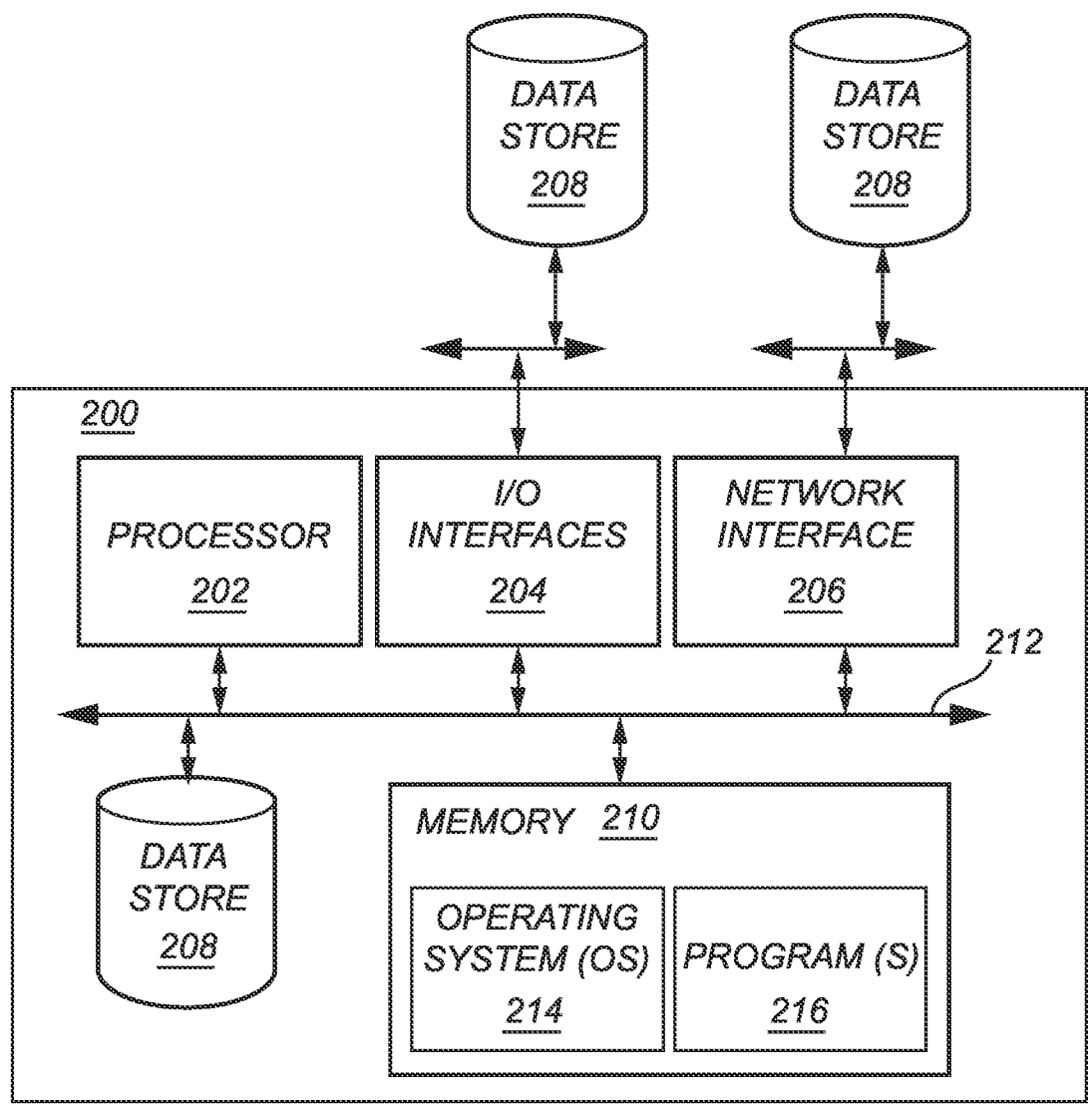
FIG. 9 is a block diagram of a server/processor that may be used in the cloud-based system of FIG. 8 or stand-alone.

FIG. 8 is a network diagram of a cloud-based system 100 for implementing various cloud-based services of the present disclosure. The cloud-based system 100 includes one or more cloud nodes (CNs) 102 communicatively coupled to the Internet 104 or the like. The cloud nodes 102 may be implemented as a server 200 (as illustrated in FIG. 9) or the like and can be geographically diverse from one another, such as located at various data centers around the country or globe. Further, the cloud-based system 100 can include one or more central authority (CA) nodes 106, which similarly can be implemented as the server 200 and be connected to the CNs 102. For illustration purposes, the cloud-based system 100 can connect to a regional office 110, headquarters 120, various employee's homes 130, laptops/desktops 140, and mobile devices 150, each of which can be communicatively coupled to one of the CNs 102. These locations 110, 120, and 130, and devices 140 and 150 are shown for illustrative purposes, and those skilled in the art will recognize there are various access scenarios to the cloud-based system 100, all of which are contemplated herein. The devices 140 and 150 can be so-called road warriors, i.e., users off-site, on-the-road, etc. The cloud-based system 100 can be a private cloud, a public cloud, a combination of a private cloud and a public cloud (hybrid cloud), or the like.

Again, the cloud-based system 100 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 110, 120, and 130 and devices 140 and 150. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein are not necessarily limited thereby.

FIG. 9 is a block diagram of a server 200, which may be used in the cloud-based system 100 (FIG. 8), in other systems, or stand-alone. For example, the CNs 102 (FIG. 8) and the central authority nodes 106 (FIG. 8) may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 9 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104 (FIG. 8). The network interface 206 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200.

Additionally, in another embodiment, the data store 208 may be located external to the server 200 such as, for example, an external hard drive connected to the I/O interfaces 204 (e.g., a SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable medium having computer-readable code stored thereon for programming a computer, server, appliance, device, processor, circuit, etc. each of which may include a processor to perform functions as described and claimed herein. Examples of such computer-readable mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 10:
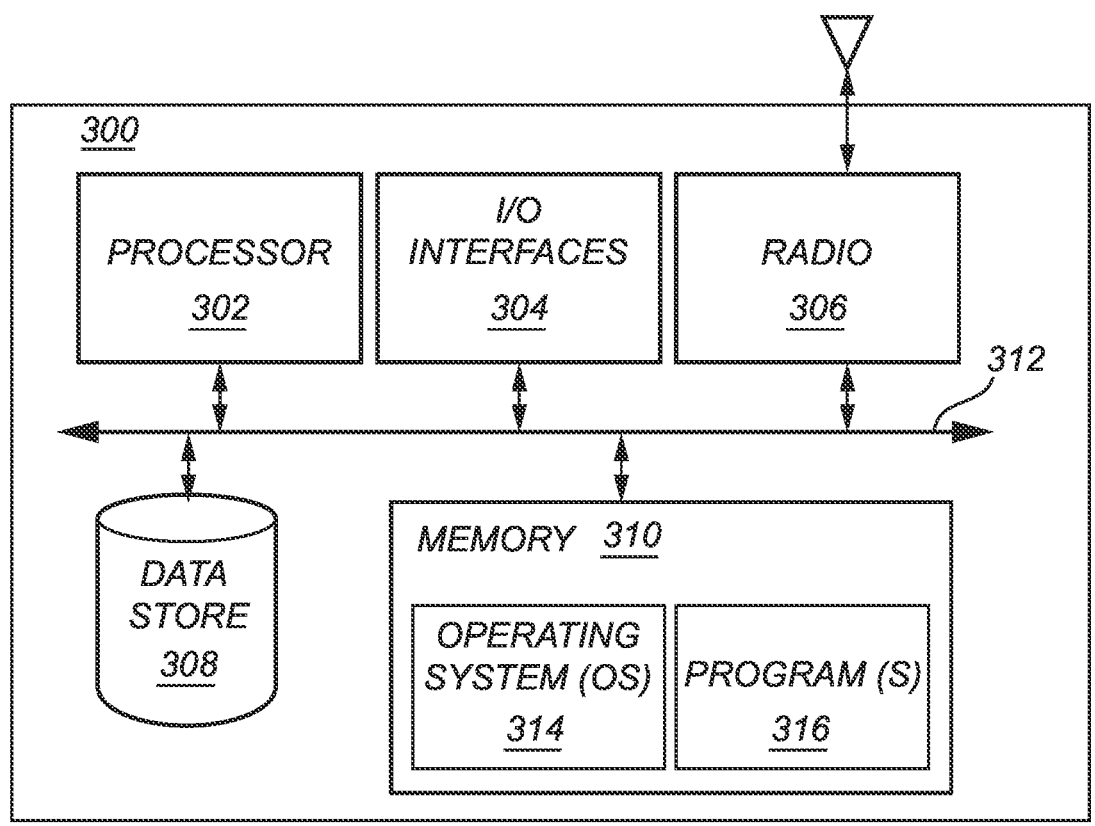
FIG. 10 is a block diagram of a user device/vehicle that may be used in the cloud-based system of FIG. 8 or stand-alone.

FIG. 10 is a block diagram of a user device 300, which may be used in the cloud-based system 100 (FIG. 8), as part of a network, or stand-alone. Again, the user device 300 can be a vehicle, a smartphone, a tablet, a smartwatch, an Internet of Things (IoT) device, a laptop, a virtual reality (VR) headset, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 9 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but is not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 10, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network, such as the cloud-based system 100 (FIG. 8).

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A vehicle noise cancellation system, comprising:
   memory storing instructions executed by a processor for receiving local contextual information affecting a soundwave present in a vehicle, wherein the local contextual information comprises an interior volume model for the vehicle and a map of obstruction object placement within the vehicle;
   memory storing instructions executed by the processor for receiving remote contextual information affecting the soundwave present in the vehicle;
   memory storing instructions executed by the processor for receiving vehicle occupant information, wherein the vehicle occupant information comprises interior camera information related to vehicle occupant head position and movement;
   a machine learning algorithm executed by the processor for processing the local contextual information, the remote contextual information, and the vehicle occupant information to generate an augmented anti-soundwave; and
   a speaker disposed in the vehicle for dynamically delivering the augmented anti-soundwave to an occupant of the vehicle to mitigate the soundwave present in the vehicle based on changes in the vehicle occupant head position and movement and the map of obstruction object placement within the vehicle.

2. The vehicle noise cancellation system of claim 1, wherein:
   the machine learning algorithm executed by the processor for processing the local contextual information, the remote contextual information, and the vehicle occupant information to generate the augmented anti-soundwave comprises a machine learning algorithm executed by the processor for processing the local contextual information, the remote contextual information, and the vehicle occupant information to generate a first augmented anti-soundwave specific to a first zone of the vehicle and a second augmented anti-soundwave specific to a second zone of the vehicle; and
   the speaker disposed in the vehicle for delivering the augmented anti-soundwave to the occupant of the vehicle to mitigate the soundwave present in the vehicle comprises a plurality of speakers disposed in the vehicle for delivering the first augmented anti-soundwave to an occupant present in the first zone of the vehicle and delivering the second augmented anti-soundwave to an occupant present in the second zone of the vehicle.

3. The vehicle noise cancellation system of claim 1, wherein the local contextual information comprises one or more of: exterior sensor information related to surroundings of the vehicle, exterior camera information related to surroundings of the vehicle, vehicle behavior information, interior camera information related to vehicle configuration, interior microphone information related to vehicle interior and/or exterior noise, speed data, vehicle configuration data, vehicle operating state data, and a vehicle noise model.

4. The vehicle noise cancellation system of claim 1, wherein the remote contextual information comprises one or more of: object information related to surroundings of the vehicle, geoposition data, traffic data, road surface data, roadwork information, weather information, and a vehicle noise model.

5. The vehicle noise cancellation system of claim 1, wherein the vehicle occupant information comprises interior microphone information related to vehicle occupant noise.

6. The vehicle noise cancellation system of claim 1, wherein the interior camera information related to the vehicle occupant head position and movement is correlated to vehicle occupant ear position and movement.

7. A vehicle noise cancellation method, comprising:
   receiving local contextual information affecting a soundwave present in a vehicle, wherein the local contextual information comprises an interior volume model for the vehicle and a map of obstruction object placement within the vehicle;
   receiving remote contextual information affecting the soundwave present in the vehicle;
   receiving vehicle occupant information, wherein the vehicle occupant information comprises interior camera information related to vehicle occupant head position and movement;
   processing the local contextual information, the remote contextual information, and the vehicle occupant information to generate an augmented anti-soundwave; and
   dynamically delivering the augmented anti-soundwave to an occupant of the vehicle to mitigate the soundwave present in the vehicle based on changes in the vehicle occupant head position and movement and the map of obstruction object placement within the vehicle.

8. The vehicle noise cancellation method of claim 7, wherein:
   processing the local contextual information, the remote contextual information, and the vehicle occupant information to generate the augmented anti-soundwave comprises processing the local contextual information, the remote contextual information, and the vehicle occupant information to generate a first augmented anti-soundwave specific to a first zone of the vehicle and a second augmented anti-soundwave specific to a second zone of the vehicle; and delivering the augmented anti-soundwave to the occupant of the vehicle to mitigate the soundwave present in the vehicle comprises delivering the first augmented anti-soundwave to an occupant present in the first zone of the vehicle and delivering the second augmented anti-soundwave to an occupant present in the second zone of the vehicle.

9. The vehicle noise cancellation method of claim 7, wherein the local contextual information comprises one or more of: exterior sensor information related to surroundings of the vehicle, exterior camera information related to surroundings of the vehicle, vehicle behavior information, interior camera information related to vehicle configuration, interior microphone information related to vehicle interior and/or exterior noise, speed data, vehicle configuration data, vehicle operating state data, and a vehicle noise model.

10. The vehicle noise cancellation method of claim 7, wherein the remote contextual information comprises one or more of: object information related to surroundings of the vehicle, geoposition data, traffic data, road surface data, roadwork information, weather information, and a vehicle noise model.

11. The vehicle noise cancellation method of claim 7, wherein the vehicle occupant information comprises interior microphone information related to vehicle occupant noise.

12. The vehicle noise cancellation method of claim 7, wherein the interior camera information related to the vehicle occupant head position and movement is correlated to vehicle occupant ear position and movement.

13. The vehicle noise cancellation method of claim 7, wherein processing the local contextual information, the remote contextual information, and the vehicle occupant information to generate the augmented anti-soundwave comprises processing the local contextual information, the remote contextual information, and the vehicle occupant information using a machine learning algorithm trained on a training dataset.

14. A non-transitory computer-readable medium comprising instructions stored in a memory and executed by a processor to carry out the vehicle noise cancellation steps comprising:

receiving local contextual information affecting a soundwave present in a vehicle, wherein the local contextual information comprises an interior volume model for the vehicle and a map of obstruction object placement within the vehicle;

receiving remote contextual information affecting the soundwave present in the vehicle;

receiving vehicle occupant information, wherein the vehicle occupant information comprises interior camera information related to vehicle occupant head position and movement;

processing the local contextual information, the remote contextual information, and the vehicle occupant information to generate an augmented anti-soundwave; and dynamically delivering the augmented anti-soundwave to an occupant of the vehicle to mitigate the soundwave present in the vehicle based on changes in the vehicle occupant head position and movement and the map of obstruction object placement within the vehicle.

15. The non-transitory computer-readable medium of claim 14, wherein:

processing the local contextual information, the remote contextual information, and the vehicle occupant information to generate the augmented anti-soundwave comprises processing the local contextual information, the remote contextual information, and the vehicle occupant information to generate a first augmented anti-soundwave specific to a first zone of the vehicle and a second augmented anti-soundwave specific to a second zone of the vehicle; and delivering the augmented anti-soundwave to the occupant of the vehicle to mitigate the soundwave present in the vehicle comprises delivering the first augmented anti-soundwave to an occupant present in the first zone of the vehicle and delivering the second augmented anti-soundwave to an occupant present in the second zone of the vehicle.

16. The non-transitory computer-readable medium of claim 14, wherein the local contextual information comprises one or more of: exterior sensor information related to surroundings of the vehicle, exterior camera information related to surroundings of the vehicle, vehicle behavior information, interior camera information related to vehicle configuration, interior microphone information related to vehicle interior and/or exterior noise, speed data, vehicle configuration data, vehicle operating state data, and a vehicle noise model.

17. The non-transitory computer-readable medium of claim 14, wherein the remote contextual information comprises one or more of: object information related to surroundings of the vehicle, geoposition data, traffic data, road surface data, roadwork information, weather information, and a vehicle noise model.

18. The non-transitory computer-readable medium of claim 14, wherein the vehicle occupant information comprises interior microphone information related to vehicle occupant noise.

19. The non-transitory computer-readable medium of claim 14, wherein the interior camera information related to the vehicle occupant head position and movement is correlated to vehicle occupant ear position and movement.

20. The non-transitory computer-readable medium of claim 14, wherein processing the local contextual information, the remote contextual information, and the vehicle occupant information to generate the augmented anti-soundwave comprises processing the local contextual information, the remote contextual information, and the vehicle occupant information using a machine learning algorithm trained on a training dataset.

* * * * *